3,264,111
DIAMINO DIPHENYL ARSINIC ACID FEED COMPOSITION AND METHOD FOR ACCELERATING GROWTH
James Ross Wiley and Timothy Scott Chang, Myerstown, Pa., assignors, by mesne assignments, to Whitmoyer Laboratories, Inc., a corporation of Delaware
No Drawing. Filed Dec. 10, 1962, Ser. No. 243,604
10 Claims. (Cl. 99—2)

This invention relates generally to feeding stuffs for animals. More particularly the invention relates to animal feed compositions containing a chemical compound having favorable growth-promoting characteristics and to a method for accelerating the growth of farmyard animals such as pigs, chickens and turkeys by administration of the chemical compound together with a basal diet which is nutritionally adequate per se for normal growth.

We have found that diamino diphenyl arsinic acid corresponding to the formula

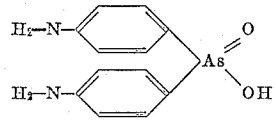

will accelerate the growth of animals when incorporated as an additive in the diet in amounts within the range of 0.01% to 0.1%. In accordance with the invention, diamino diphenyl arsinic acid is administered to the animals as an additive together with a basal diet which is per se adequate for normal growth, the amount of additive being controlled within the range of 0.01% to 0.1% based on the weight of the feed consumed. The feed may be any conventional feed made up in accordance with established principles for basal adequate diet for the particular animal to which it is to be fed. The compounding of adequate diets for the several animals is known to those skilled in the art and except for the inclusion of diamino diphenyl arsinic acid does not form a part of the present invention.

The active ingredient, namely, the diamino diphenyl arsinic acid is preferably added to the feed, as distinguished from their drinking water, in amounts within the range set forth above and may be administered to the animals by placing the mixed feed before the animals to be available at all times for consumption ad libitum, or it may be administered by controlled interrupted daily feeding, taking into account that the animal sould not partake of more than the proportionate amount of its daily diet than is desirable for effective results. However, if desired, the additive, may in certain instances, be administered in the driking water or in a feed that is in liquid or semi-liquid form. It may be used in the form of diamino diphenyl arsinic acid or its salts.

The use of diamino diphenyl arsinic acid as an additive to the basal diet is particularly advantageous in the nutrition of pigs and poultry, especially chickens, since they show material weight gains and increased efficiency of feed consumption when their normal basal diets are supplemented with a comparatively small percentage of this growth-promoting additive, it having been found that the incorporation of about 0.025% in pig feed and about 0.025% in chicken or chick feed is effective in promoting or accelerating growth without toxic or other unwanted or undesirable side effect.

In practicing our invention we prefer to use the growth-promoting additive intermixed with a solid feed such as grain mixtures, mash, or other comminuted mixtures, that provide a basal feed composition; but the additive may be incorporated in the drinking water either in the form of a soluble salt to form an aqueous solution, or to form a suspension if the additive is used in a form that is not readily soluble.

If desired, certain other drugs, such as commonly used coccidiostats or antibiotics may be used in the feed composition in addition to growth-promoting agent, diamino diphenyl arsinic acid, to obtain the benefits without adversely effecting the advantages gained by the incorporation of diamino diphenyl arsinic acid in the basal diet.

To demonstrate the effects of diamino diphenyl arsinic acid as an active growth-promoting additive for stimulating and increasing or accelerating growth there are described hereinafter various experiments or tests that have been conducted which will serve as illustrative of the invention.

In the following tables there are set forth in tabular form the results of tests which were carried out with pigs and chickens of different ages. In the tables certain abbreviations are used for convenience. As used herein it will be understood that abbreviation D.D.A.A. is intended to mean diamino diphenyl arsinic acid.

In Table I, there are shown the results of a series of experiments in which Arbor-Acres-Vantress-Cross chickens were used. This is a well known type of so-called broiler chickens. A number of day-old chicks were divided into three groups of twenty-five each. The three groups were raised as separate groups under the same conditions and environment except that the control group did not receive any diamino diphenyl arsinic acid in their diet, whereas one group received 0.01% and the other group received 0.05% (based on weight of feed) intermixed in their feed which was a commercial broiler starter-grower ration. Drinking water was available at all times and the chickens consumed the feed ad libitum. Table I shows the number of birds in each group, average weight in grams of the day-old chicks, average weight at the age of four weeks, weight percentae gain over the controls, feed consumption in pounds, and feed efficiency at the end of four weeks. Feed efficiency means pounds of feed consumed per pound of weight gained by the animal.

TABLE I
[Chickens]

| Group | No. of Birds | Average Weight (gm.) | | Weight Percent Over Control | Feed Consumption (lb.) | Feed Efficiency |
|---|---|---|---|---|---|---|
| | | Day-old | 4-wk.-old | | | |
| Control | 25 | 33 | 517 | | 2.00 | 1.90 |
| DDAA, 0.01% | 25 | 37 | 549 | 6 | 1.99 | 1.76 |
| DDAA, 0.05% | 25 | 38 | 563 | 9 | 2.03 | 1.76 |

Table II shows the results of similar experiments with another large group of chickens, it being noted that one group of 25 chickens received 0.05% and another 0.1% diamino diphenyl arsinic acid, and the control group received none.

TABLE II
[Chickens]

| Group | No. of Birds | Average Weight (gm.) | | Weight Percent Over Control | Feed Consumption (lb.) | Feed Efficiency |
|---|---|---|---|---|---|---|
| | | Day-old | 4-wk.-old | | | |
| Control | 25 | 38 | 490 | | 1.91 | 1.92 |
| DDAA, 0.05% | 25 | 38 | 535 | .91 | 2.04 | 1.86 |
| DDAA, 0.1% | 25 | 38 | 566 | 19 | 2.14 | 1.84 |

It will be observed in Table I that at both the 0.01% level and 0.05% level and in Table II at both 0.05% level and 0.1% level of diamino diphenyl arsinic acid in the feed that this additive is effective in promoting and accelerating growth and it also accounts for better feed efficiency. Moreover there was no evidence of any toxic effect at 0.1% level.

Tables III and III-A show the results of another series of tests carried out in a simliar way with other groups of chickens. In this instance the Table III shows the results at the end of four weeks, beginning with day-old chicks, and Table III-A shows the weights of the chickens at the age of four, six and seven weeks and the feed consumption and feed efficiency when the chickens were seven weeks of age.

TABLE III
[Chickens]

| Group | No. of Birds | Average Weight (gm.) | | Weight Percent Over Control | Feed Consumption (lb.) | Feed Efficiency |
|---|---|---|---|---|---|---|
| | | Day-old | 4-wk.-old | | | |
| Control | 25 | 38 | 499 | | 2.06 | 2.03 |
| DDAA, 0.05% | 25 | 38 | 555 | 11 | 2.20 | 1.93 |
| DDAA, 0.1% | 25 | 38 | 565 | 13 | 2.26 | 1.94 |

TABLE III-A
[Chickens]

| Group | Av. Weight at 4-wk.-old (gm.) | Av. Weight at 6-wk.-old (gm.) | Av. Weight at 7-wk.-old (gm.) | Feed Consumption (lb.) | Efficiency |
|---|---|---|---|---|---|
| Control | 499 | 855 | 1,101 | 5.60 | 2.39 |
| DDAA, 0.05% | 555 | 951 | 1,214 | 5.87 | 2.27 |
| DDAA, 0.1% | 565 | 919 | 1,150 | 5.72 | 2.33 |

The results of the tests tabulated in Tables III and III-A show that the groups of chickens which received the diamino diphenyl arsinic acid had better weight gain and showed better feed efficiency than the control group which received none.

Table IV shows the results of tests conducted with chickens. In this test the control group and the group receiving the .025% diamino diphenyl arsinic acid were grown under the same conditions in litter pens and it is to be noted that the feed was a commercial broiler starter-grower ration which also contained a known coccidiostat.

It will be observed that the group receiving 0.025% of diamino diphenyl arsinic in their feed showed better weight gain and feed efficiency than the control group at six weeks of age. The same test was continued until the chickens were eight weeks of age at which time the group receiving the diamino diphenyl arsinic acid showed an average weight of 1442 grams as against an average weight of 1382 grams for the control group. At eight weeks of age the group receiving the growth-promoting additive showed a 5% weight gain over the controls. The treated group showed feed efficiency of 2.22 whereas the control group showed a feed efficiency of 2.29, thus showing that the treated group required less feed per pound of weight gain.

Table V shows the results of using the sodium salt of diamino diphenyl arsinic acid in drinking water consumed by chickens. In this test chickens from the same hatching, beginning at one day old chicks, were fed the same feed ration but containing no growth-promoting agent. Drinking water was available to all groups for consumption ad libitum. The drinking water of the control group did not contain any additive; the drinking water of one group contained 0.00625% and the drinking water of the other group contained 0.0125% of the sodium salt of diamino diphenyl arsinic acid. This is the equivalent of 0.0125% and 0.025% respectively in solid feed because chickens normally consume about twice as much drinking water (by weight) as solid feed.

TABLE IV
[Chickens]

| Group | No. of Birds | Average Weight (gm.) | | | | Weight Percent Over Control, 6-wk. | Feed Consumption (lb.) 6-wk. | Feed Efficiency, 6-wk. | Average Weight, 8-wk. (gm.) | Weight Percent Over Control, 8-wk. | Feed Consumption (lb.) 8-wk. | Feed Efficiency, 8-wk. |
|---|---|---|---|---|---|---|---|---|---|---|---|---|
| | | Day-old | 2-wk. | 4-wk. | 6-wk. | | | | | | | |
| (a) DDAA, 0.025% | 300 | 44 | 181 | 514 | 979 | 7 | 4.22 | 2.05 | 1,442 | 5 | 6.84 | 2.22 |
| (b) Control | 300 | 44 | 174 | 485 | 918 | | 4.15 | 2.16 | 1,382 | | 6.77 | 2.29 |

TABLE V
[Chickens (Drinking Water)]

| Group | No. of Birds | Average Weight, (gm.) | | | | | Feed Consumption (lb) | Feed Efficiency |
|---|---|---|---|---|---|---|---|---|
| | | Day-Old | 1-wk. | 2-wk. | 3-wk. | 4-wk. | | |
| Control | 25 | 32 | 75 | 174 | 317 | 502 | 1.91 | 1.85 |
| DDAA, 0.00625% (Sodium Salt) | 25 | 32 | 79 | 179 | 321 | 511 | 1.94 | 1.84 |
| DDAA, 0.0125% (Sodium Salt) | 25 | 33 | 83 | 189 | 345 | 540 | 1.99 | 1.78 |

It will be seen that the chickens receiving drinking water containing the growth-promoting additive together with their normal rations showed better weight gain and better feed efficiency than the control. At four weeks of age, the higher concentration (.0125%) resulted in an 8% better weight gain and 4% better feed efficiency than the control group. Inasmuch as chickens ordinarily partake of about twice as much drinking water as solid feed by weight, the concentration of the additive in the drinking water is preferably reduced proportionately; that is, to about half the amount as when used in the solid feed.

The use of diamino diphenyl arsinic acid as an additive in the diet of swine to promote growth is illustrated in a series of tests now to be described.

Four litters numbering thirty pigs were used for the test. These were crossbred litters. Their sows were each a Berkshire-Poland China cross and each was bred to a purebred Hampshire boar. Prior to weaning, all of the pigs were treated and handled in the same way. The males were castrated at 34 days. The same pre-starter feed was available to all pigs up to the time of weaning. At the time of weaning at 6 weeks and 6 days of age the 30 pigs were randomly divided by sex, weight, and breeding into three groups of ten to a group. The three groups are designated herein as Groups A, B, and C. Each group of ten was placed in a separate but similar concrete confinement pen, each provided with an automatic feeder and an automatic waterer. Each group was fed the same feed and in all ways treated in the same manner except that Group A (herein called the control group) was fed a basal ration that did not contain any diamino diphenyl arsinic acid; Group B was fed the same basal ration having intermixed therewith 0.0125% diamino diphenyl arsinic acid as a growth-promoting additive; and Group C was fed the same basal ration having intermixed therewith 0.025% diamino diphenyl arsinic acid as a growth-promoting additive.

The basal ration and ingredients set forth in parts by weight are shown in Table A: Column I, showing the ingredients of the basal feed used when the pigs weighed from about 30 to about 110 pounds; Column II, showing the basal ration when the pigs were from about 110 pounds to about 160 pounds, and Column III when the pigs weighed about 160 pounds to the end of the test. The total feeding period from the beginning of the test, at the time of weaning to the end of the test, or market weight, was 108 days.

TABLE A

| Ingredients | 30 lbs. to 110 lbs. | 110 lbs. to 160 lbs. | 160 lbs. to Market Wt. |
|---|---|---|---|
| Ground Yellow Corn | 1,300 | 1,450 | 1,600 |
| 35% Supplement | 600 | 450 | 300 |
| Molasses | 90 | 90 | 90 |
| Salt | 10 | 10 | 10 |
| Est. Protein, percent | 16.2 | 14.2 | 12.2 |

The test time was divided into three periods of 30 days (First Period), 30 days (Second Period), and 48 days (Third Period) respectively, making a total of 108 days. In Table VI there are set forth the results for the three periods and the 108 day summary.

The following is an—

*Index for Table VI*

Group A—Fed basal ration but no additive.
Group B—Fed basal ration plus 0.0125% additive.
Group C—Fed basal ration plus 0.025% additive.
Additive—Diamino diphenyl arsinic acid (DDAA).
No. Animals—Number of Pigs.
Av. Init. Wt., Lbs.—Average Initial Weight in Pounds.
Av. Final Wt., Lbs.—Average Final Weight in Pounds.
Av. Da. Gain, Lbs.—Average Daily Gain in Pounds
Feed/lb. Gain, Lbs.—Feed Efficiency, i.e., pounds of feed consumed per weight gain of one pound.

TABLE VI
[Pigs]

| | Group A Control | Group B 0.0125% DDAA | Group C 0.025% DDAA |
|---|---|---|---|
| First Period, 30 days: | | | |
| No. Animals | 10 | 10 | 10 |
| Av. Init Wt, lbs | 29.3 | 29.0 | 29.3 |
| Av. Final Wt., lbs | 63.2 | 60.5 | 65.9 |
| Av. Da. Gain, lbs | 1.13 | 1.05 | 1.22 |
| Feed/lb. Gain, lbs | 2.61 | 2.60 | 2.58 |
| Second Period, 30 days: | | | |
| No. Animals | 10 | 10 | 10 |
| Av. Init. Wt., lbs | 63.2 | 60.5 | 65.9 |
| Av. Final Wt., lbs | 107.4 | 107.9 | 112.5 |
| Av. Da. Gain, lbs | 1.47 | 1.58 | 1.55 |
| Feed/lb. Gain, lbs | 3.88 | 3.16 | 3.65 |
| Third Period, 48 days: | | | |
| No. Animals | 10 | 10 | 10 |
| Av. Init. Wt., lbs | 107.4 | 107.9 | 112.5 |
| Av. Final Wt., lbs | 119.8 | 208.2 | 213.5 |
| Av. Da. Gain, lbs | 1.93 | 2.09 | 2.10 |
| Feed/lb. Gain, lbs | 4.27 | 4.11 | 4.07 |
| Overall, 108 days: | | | |
| No. Animals | 10 | 10 | 10 |
| Av. Init. Wt., lbs | 29.3 | 29.0 | 29.3 |
| Av. Final Wt., lbs | 199.8 | 208.2 | 213.5 |
| Av. Da. Gain, lbs | 1.58 | 1.66 | 1.71 |
| Feed/lb. Gain, lbs | 3.84 | 3.60 | 3.65 |

It will be observed from the data in the above Table VI that during the first period, Group B whose feed contained diamino diphenyl arsinic acid at the 0.0125% level did not shown a weight gain when compared with the control, Group A, but there is a slight advantage in feed efficiency. However, Group C whose feed contained diamino diphenyl arsinic acid at the 0.025% level showed a better weight gain and feed efficiency, the increase in daily weight gain over the control group being 8%.

In the second period, Group B at the 0.0125% level of diamino diphenyl arsinic acid in their feed showed an increased daily weight gain of 7.5% over the control group and an improved feed efficiency of 18.6% over the control group. At the 0.025% level of diamino diphenyl arsinic acid Group C showed an increased daily weight gain of 5.9% and an improved feed efficiency of 5.9% over the control group.

In the third period, Group B showed an increased daily weight gain of 8.3% and an improved feed efficiency of 3.7%, over the control group. Group C showed an increased daily weight gain of 8.8% and an improved feed efficiency of 4.7% over the control group.

Summarizing the entire 108 day test period, Group B whose basal feed ration contained 0.0125% diamino diphenyl arsinic showed a daily weight gain of 5.1% and an improved feed efficiency of 6.2% over the control Group A. And Group C whose basal feed ration contained 0.025% diamino diphenyl arsinic acid showed an increased daily weight gain of 8.2% and an improved feed efficiency of 6.2%, over the control Group A.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An animal feedstuff for accelerating the growth of poultry and swine which compriess a feedstuff, nutritionally adequate per se having incorporated therein as a growth-promoting additive, a compound selected from the class consisting of diamino diphenyl arsinic acid and the salts thereof, said additive being present in an amount within the range of 0.01% to 0.1% based upon the weight of the feedstuff.

2. A poultry feed composition for accelerating the growth of the poultry which comprises a poultry feed nutritionally adequate per se as a basal poultry ration and form 0.01% to 0.05% by weight of a growth-promoting additive selected from the class consisting of diamino diphenyl arsinic acid and the salts thereof.

3. A composition according to claim 2 in which the growth-promoting additive is diamino diphenyl arsinic acid and is present in an amount of about 0.025% of the weight of the feed.

4. A chicken feed composition for accelerating the growth of chickens which comprises a mixture of chicken feed nutritionally adequate per se as a basal ration and about 0.025% diamino diphenyl arsinic acid as a growth promoting additive.

5. A pig feed composition for accelerating the growth of pigs which comprises a mixture of pig feed nutritionally adequate per se as a basal pig ration and an amount of diamino diphenyl arsinic acid within the range of about 0.0125% to about 0.025% based upon the weight of the feed.

6. A method of accelerating the growth of poultry and swine which comprises administering to said animals an additive compound selected from the class consisting of diamino diphenyl arsinic acid and the salts thereof by feeding to said animals ad libitum a ration nutritionally adequate per se together with said additive in an amount within the range of 0.01% to 0.1% of the weight of the ration.

7. A method according to claim 6 in which the amount of additive administered to said animals is within the range of from 0.01% to 0.1% of the weight of the feed ration.

8. A method of accelerating the growth of poultry which comprises administering to the poultry an additive compound selected from the class consisting of diamino diphenyl arsinic acid and salts thereof, by feeding the poultry ad libitum a feed ration nutritionally adequate per se together with said additive in an amount within the range of about 0.01% and 0.1% based on the weight of the feed ration.

9. A method of accelerating the growth of chickens which comprises feeding said chickens ad libitum a feed nutritionally adequate per se as a chicken ration together with about 0.025% of diamino diphenyl arsinic acid based upon the weight of the feed ration.

10. A method of accelerating the growth of pigs which comprises feeding said pigs ad libitum a feed nutritionally adequate pe se as a pig ration together with about 0.025% of diamino diphenyl arsinic acid based upon the weight of the feed ration.

References Cited by the Examiner

UNITED STATES PATENTS 2,606,200   8/1952   Matson et al. _____ 99—2

FOREIGN PATENTS 562,589   9/1958   Canada.

OTHER REFERENCES

Chem Abst, 49 16237 f (1955).

Cunha: Swine Feeding and Nutrition, Interscience Pub. Inc., N.Y., 1957, p. 160.

A. LOUIS MONACELL, *Primary Examiner.*

D. J. DONOVAN, *Assistant Examiner.*